Sept. 29, 1931.    A. R. DOBBS    1,825,386
COMBINED GOGGLES FOR GRINDING AND WELDING
Filed May 20, 1931
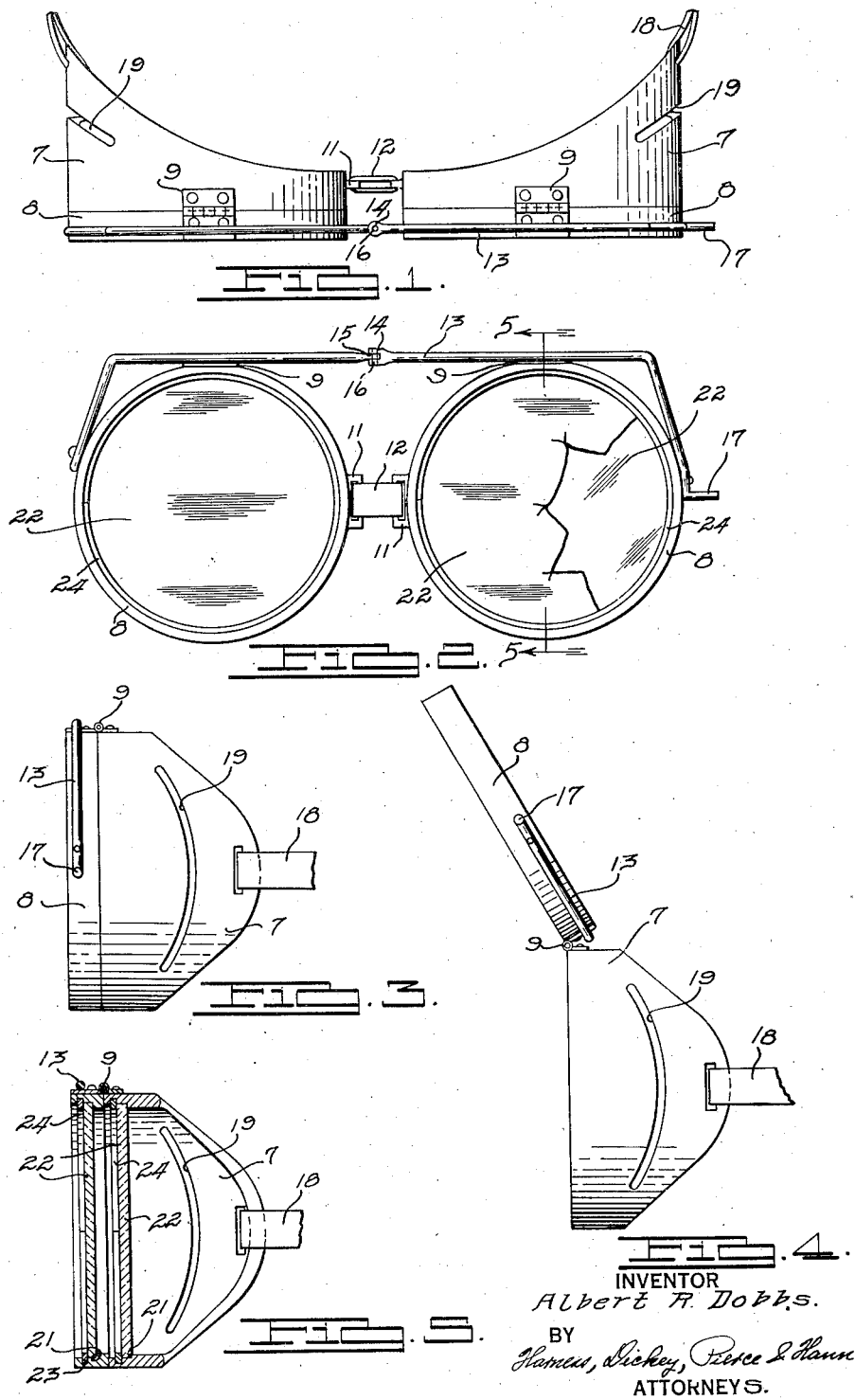
INVENTOR
Albert R. Dobbs.
BY
Hamess, Dickey, Pierce & Hann.
ATTORNEYS.

Patented Sept. 29, 1931

1,825,386

UNITED STATES PATENT OFFICE

ALBERT R. DOBBS, OF EAST DETROIT, MICHIGAN

COMBINED GOGGLES FOR GRINDING AND WELDING

Application filed May 20, 1931. Serial No. 538,696.

My invention relates to goggles and particularly to a goggle provided with colored and plain lenses which are employed in conjunction with each other during a welding operation and which are relatively movable to permit the colored lenses to be moved to a position out of the path of vision through the plain lenses during a grinding or similar operation.

Accordingly, the main objects of my invention are to provide a pair of goggles having relatively movable colored and plain lenses supported in frames which are retained over the eyes of an operator; to support the colored lenses by hinged means to the frame in such manner that they may be swung upwardly out of the path of vision through the plain lenses; to provide a member interconnecting the colored lenses whereby both may be moved relative to the plain lenses; to provide a pivotal joint on the interconnecting member in alignment with the flexible bridge piece of the goggle in such manner as to have the colored lenses retained in raised or lowered position when they are disposed in intersecting planes.

Other objects and features of novelty of my invention will be either specifically pointed out or will become apparent when referring, for a better understanding of my invention, to the following description in conjunction with the accompanying drawings, wherein:—

Figure 1 is a plan view of a goggle embodying features of my invention,

Figure 2 is a view, in elevation, of the structure illustrated in Figure 1,

Figure 3 is a side view of the structure illustrated in Figure 2, with the colored lenses in lowered position, Figure 4 is a side view of the structure illustrated in Figure 2 with the colored lenses in raised position, and Figure 5 is a sectional view of the structure illustrated in Figure 2 taken on the line 5—5 thereof.

Considerable damage has resulted in the past, to the eyes of welders because of the fact that the colored lenses provided in the welding goggles are of such deep color that the goggles can be employed for protecting the eyes only against an extremely strong light. When it is necessary for the welder to examine his work or to effect a grinding operation thereon, which is ofttimes necessary, the colored goggles are lifted from the eyes and the eyes are unprotected against flying sparks or particles and as a result considerable damage results thereto.

In practicing my invention I overcome this difficulty by providing a pair of goggles having colored and plain lenses mounted in the eye pieces or guards thereof, both of which are employed during the welding operation. When the colored lenses are lifted upwardly on the guards, the transparent lenses are then available to provide clear vision and to protect the eyes of the operator against flying particles. A member is provided for interconnecting the colored lenses so that they may be moved together to either raised or lowered position through the movement of one of the lenses or the member. A singly pivotal joint is provided in the center of the interconnecting member which functions as a holding means when the lenses are in intersecting planes for retaining the colored lenses in either the raised or lowered position.

In Figure 1 I have illustrated a pair of goggles which include guards 7, made of metal or of a fiber material, well known in the art, upon the ends of which frames 8 are supported by hinges 9 which are riveted or otherwise attached to the guards and the frames.

U-shaped members 11 are attached to the adjacent sides of the guards 7, by rivets or other suitable means, and are connected together by a flexible strap 12 which constitutes a bridge piece for the guards. The two frames 8 are connected together by a centrally hinged rod 13 which is riveted or otherwise attached to the top and the sides thereof. The central hinge of the rod comprises a bifurcated end 14 on one portion of the rod which engages a flat end 15 on the other portion thereof and are retained in pivotal relation by a pin 16. The inner surface of the bifurcated end 14 is flat and in contiguous relation to the flat sides of the end 15 of the other portion of the rod to limit the play therebetween and to permit the frames to pivot with the guards when disposed thereagainst. When the frames 8 are disposed at ninety degrees to the guards 7, the pin 16 of the hinge is positioned normal to the bridge piece and for this reason the guards must assume a parallel relation, since the portions of the rod 13 assume an axially aligned position and the rod is rigid relative to the guards when in this position.

Since the guards 7 are provided with a flexible nose piece 12, they will be bent out of a parallel plane when worn, so that during the upward movement of the frames 8 the guards 7 must adjust themselves into parallelism in order that the hinged rod may move into axial alignment while the frames are passing through a plane normal to the guards. When in raised position the guards 7 again assume a position out of parallelism on the face of the welder with the portions of the rod 13 out of axial alignment which prevent the frames 8 from swinging down to the position illustrated in Figures 1 to 3 and 5 inclusive. It therefore requires that a positive force be applied to the frames 8 to move the guards 7 into parallelism in order to swing the frames into a position illustrated in Figure 4. This relation between the rod 13 and the guards provides a holding force for retaining the frames in raised and in lowered positions.

An extension 17 may be provided on the rod 13 to serve as a handle for effecting the actuation of the frames 8 to either of their positions. Suitable means, such as a flexible band 18, may be attached to the outer ends of the guards 7 for extending about the head of the wearer for retaining the goggles in adjusted position. Slots 19 may be provided in the sides of the guards 7 for the purpose of ventilation and for preventing the condensation of moisture on the inner surfaces of the lenses.

In Figure 5 I have shown a section through a guard 7 and a frame 8 for the purpose of illustrating the method which I prefer to employ for retaining the lenses therein.

The inner front surface of the guards and frames are enlarged to form a shoulder 21 for receiving the lenses 22, which are of clear transparent glass, or other suitable material, in the guards and which are of colored material in the frames. An annular slot 23 is disposed in the inner enlarged portion of the guards and frames, frontwardly of the lenses 22, in which a split spring ring 24 is snapped for the purpose of retaining the lenses therein in a well known manner.

When a pair of goggles above described, are worn by an operator during a welding operation the colored lenses in the frames 8 protect the welder's eyes during the time the welding operation is being conducted and thereafter protection against flying particles is provided by the clear lenses of the guards 7 when the colored lenses in the frames 8 have been moved upwardly out of the vision of the welder. The eyes are protected from dust and fine particles during the observation of the welded joint and in case a chipping or a grinding operation is required, the eyes will likewise be protected.

The extension 17, provided on the rod 13 of the goggles, is positioned on the left hand side of the operator in order that the colored lenses may be moved into or out of the vision of the wearer by a left hand movement since the right hand is usually employed for grasping the welding tool. It is to be understood that it is within the purview of my invention to provide a handle 17 on both sides of the goggles in order that either hand may be employed for moving the colored lenses into either desired position.

The colored lenses are retained in lowered or raised position because of the disposition of the lenses in intersecting planes when in adjusted position on the wearer's face. In this position the portions of the rod 13 are moved out of axial alignment and thereby prevent the movement of the colored lenses from either position except by a positive force sufficient to move the guards 7 into parallelism.

While I have described and illustrated but a single embodiment of my invention, it will be apparent to those skilled in the art that various changes, omissions, additions and substitutions may be made therein without departing from the spirit and scope of my invention, as set forth in the accompanying claims.

I claim as my invention:

1. A pair of guards for encompassing the eyes having transparent lenses therein and joined together by a flexible bridging member to constitute a goggle, a pair of colored lenses supported on said guards and swingable to raised or lowered position relative thereto, and a hinged member joining said frames together.

2. A pair of guards for encompassing the eyes having transparent lenses therein and joined together by a flexible bridging member to constitute a goggle, a pair of frames having colored lenses, hinges supporting said frames on said guard, and a hinged rod joining said frames together.

3. A goggle including a pair of transparent lenses mounted in guards which are joined together by a flexible bridging member, pair of frames hinged to said guards, colored lenses in said frames, a hinged rod joining said frames together, and an extension on said rod constituting a handle by means of which the frames for the colored lenses are actuated in unison.

4. A goggle including a pair of guards supporting transparent lenses and joined together by a flexible bridging member, a pair of frames hinged to said guard, colored lenses mounted in said frame, a hinged rod joining said frames together, said rod being rigid in one direction causing the portions thereof to assume an axially aligned position when the frames extend normal to the guards to require a positive force for moving the frames beyond said normal position in either direction.

5. A pair of guards for encompassing the eyes having transparent lenses therein and joined together by a flexible member to constitute a goggle, two frames hinged to said guards, colored lenses supported in said frames, a hinged rod joining said frames together, said hinge being relatively movable when the frames are in raised or lowered position and being rigid when in a medial position.

6. A pair of guards for encompassing the eyes having transparent lenses therein and joined together by a flexible member to constitute a goggle, a plurality of frames hinged to said guards, colored lenses mounted in said frames, a hinged rod joining said frames together, and a pivot in said hinge which is parallel to said transparent lenses when the colored lenses are in lowered position.

7. A pair of guards for encompassing the eyes having transparent lenses therein and joined together by a flexible member to constitute a goggle, a plurality of frames hinged to said guards, colored lenses mounted in said frames, a hinged rod joining said frames together, and a pin in said hinge which is normal to a plane through the flexible nose piece when the frames are disposed normal to the guards.

8. A pair of guards for encompassing the eyes having transparent lenses therein and joined together by a flexible member to constitute a goggle, a plurality of frames hinged to said guards, colored lenses mounted in said frames, a hinged rod joining said frames together, and a pin in said hinge which is parallel to a plane through said colored lenses.

9. A pair of guards for encompassing the eyes having transparent lenses therein and joined together by a flexible member to constitute a goggle, a plurality of frames hinged to said guards, colored lenses mounted in said frames, and a hinge joining said frames together, said hinge being flexible in one direction for causing the differential movement of the guards when the frames are swung to and beyond a position normal thereto.

ALBERT R. DOBBS.